Nov. 24, 1970    L. RODA ET AL    3,543,128
GENERATOR WITH AUTOMATIC STATIC REGULATOR
Filed June 29, 1967    2 Sheets-Sheet 1

INVENTORS
LUCIANO RODA
CAMILLO CAUDIOSO
BY
ATTORNEY.

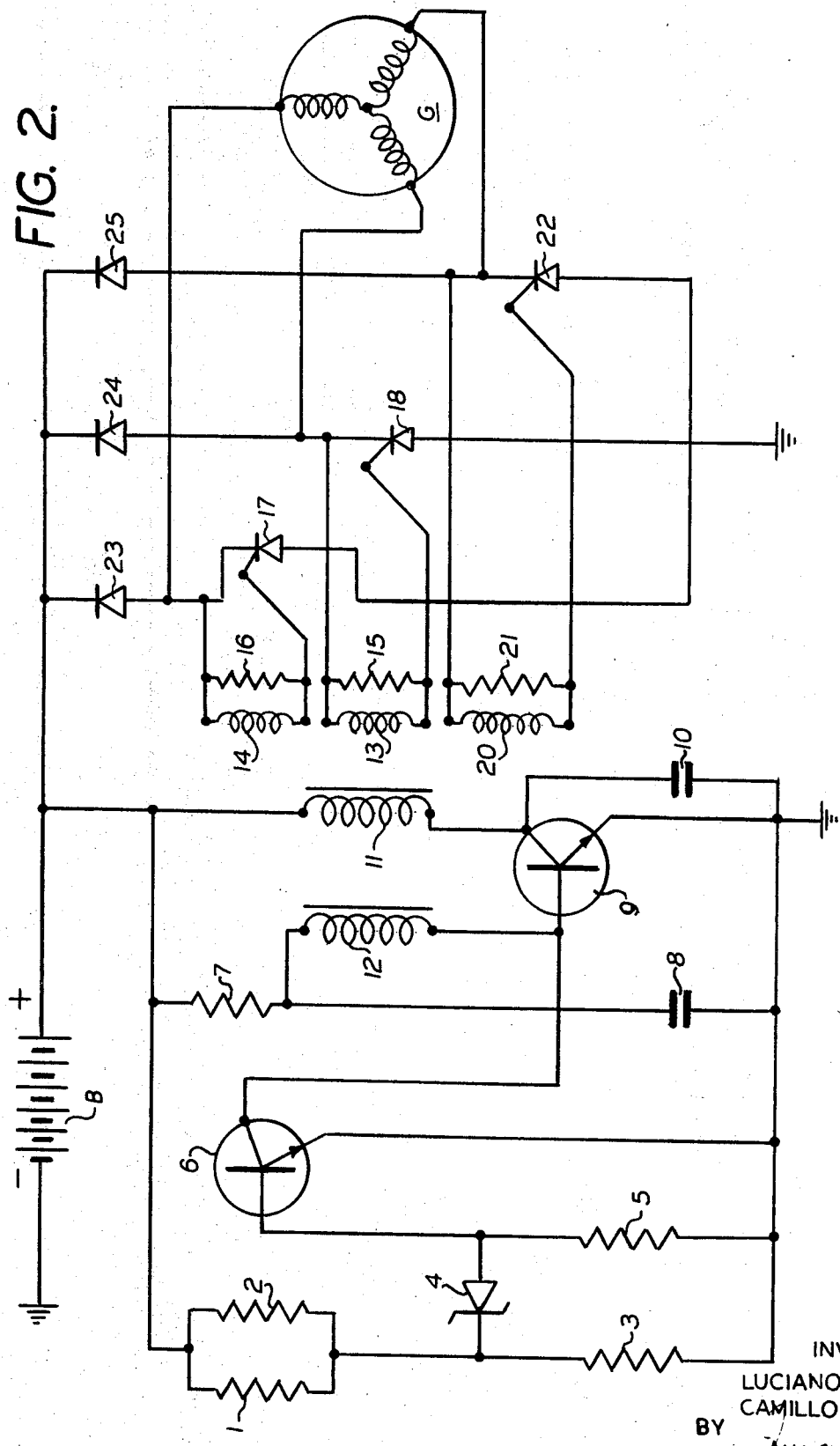

United States Patent Office 3,543,128
Patented Nov. 24, 1970

3,543,128
GENERATOR WITH AUTOMATIC STATIC REGULATOR
Luciano Roda and Camillo Caudioso, Bologna, Italy, assignors to Ducati Elettrotecnica S.p.A., Bologna, Italy, a corporation of Italy
Filed June 29, 1967, Ser. No. 649,891
Claims priority, application Italy, July 4, 1966, 80/31, Patent 15,138
Int. Cl. H02j 7/32
U.S. Cl. 320—61   6 Claims

ABSTRACT OF THE DISCLOSURE

An electric generator battery recharging device having an automatic static regulator comprising a permanent magnet rotor means for producing a mono- or three-phase rectifier AC battery charging voltage, an oscillator, and a controlled diode rectifier connected to the oscillator and to the rotor means for actuating the latter when the oscillator is operative, the oscillator operating at a frequency of about 30,000 Hz.

---

The present invention relates to electrical apparatus for recharging batteries, in general, and to a specially adapted unit for installations in vehicles, in particular.

It is known that, because of the various advantages offered, it is usual to recharge car batteries by mono- or three-phase rectified alternating current generators which are coupled to static regulator devices containing various types of magnetic reactors.

It is equally well known that in these appliances, control and automatic regulation of the voltage and/or the recharging current is effected by means of diodes.

These conventional devices, although quite satisfactory in operation, however, are considerably complicated, particularly since the reactors have great weight and large size, and waste a considerable amount of energy in regulating.

It is one object of the present invention to provide an apparatus for recharging batteries in which a mono- or three-phase AC generator with permanent magnets in the rotor, is combined with an electronically-operated regulator or automatic control means, consisting substantially of an oscillator operating on a working frequency somewhere around 30,000 Hz.

With this and other objects in view, which will become apparent in the following detailed description, the present invention will be more clearly understood, in connection with the accompanying drawings, in which:

FIG. 2 is a circuit diagram of a device for recharging batteries with a three-phase generator, designed in accordance with the present invention.

Figure 1:
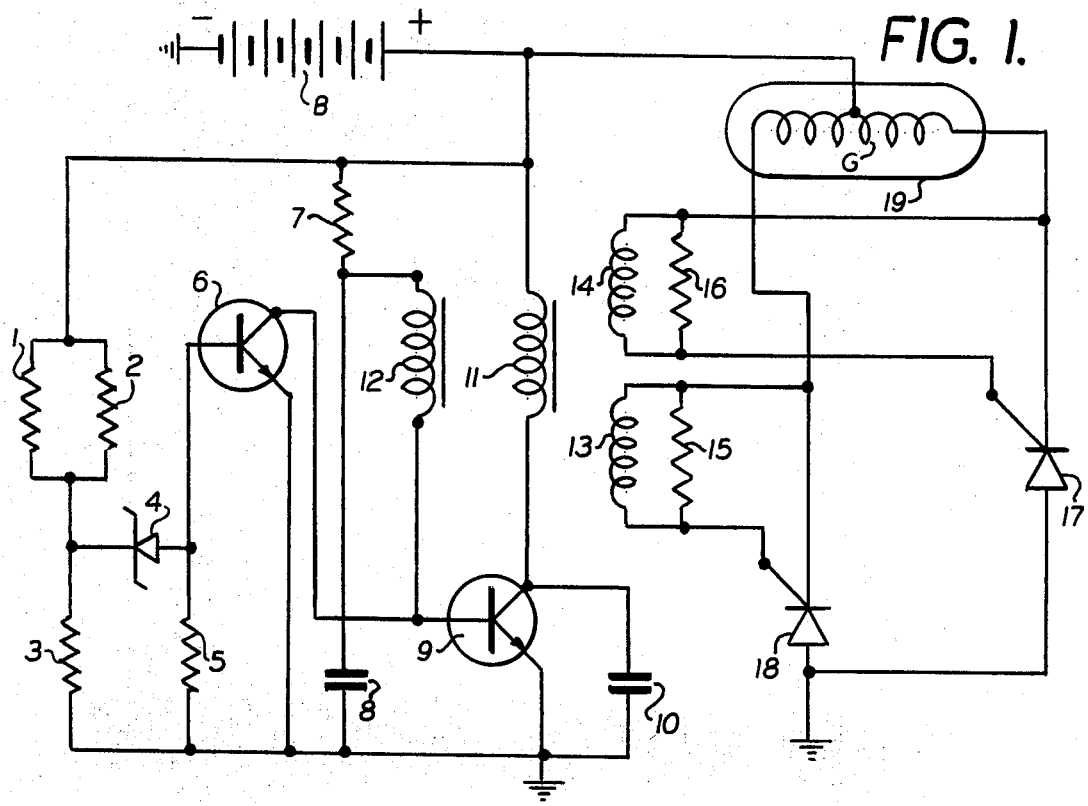
FIG. 1 is a circuit diagram of a device for recharging batteries with a monophase generator, designed in accordance with the present invention.

Referring now to the drawings, and in particular to FIG. 1, charging of the battery B is effected by a monophase AC generator G.

A group of resistors 1, 2 and 3, respectively, constitute a potentiometer, rated to a suitable voltage, that is, to a voltage beyond which the charging current must be cut off.

A Zener diode 4 allows the passage of a small current when the above-mentioned voltage is slightly exceeded; while a low-powered silicium transistor 6 is saturated by the passage of the current through the Zener diode 4 itself.

Resistor 5 eliminates the most uncertain part of the Zener diode's characteristic.

A silicium transistor 9, a small transformer with a magnetic core carrying independent windings 11, 12, 13 and 14, a resistor 7, and a condenser 8, constitute an oscillator operating with a working frequency of about 30,000 Hz.

When the circuit is subjected to voltage, and transistor 6 is blocked, transistor 9, through resistor 7 and reactance coil 12, receives a base current which tends to bring it to conduction only after a certain time, defined by condenser 8.

At this moment the establishment of a certain current in coil 11 produces a reaction in the primary winding, which completely saturates transistor 9, discharging condenser 8. This causes transistor 9 to turn off since its base current is cancelled and transistor 9 then begins a new cycle equal to that just terminated. Resistor 7 and condenser 8 are obviously the parameters which determine the work frequency of the oscillator.

Condenser 10 serves to cut the voltage peaks, which would otherwise generate on transistor 9 due to the sharp breaks of inductive current.

Figure 3:
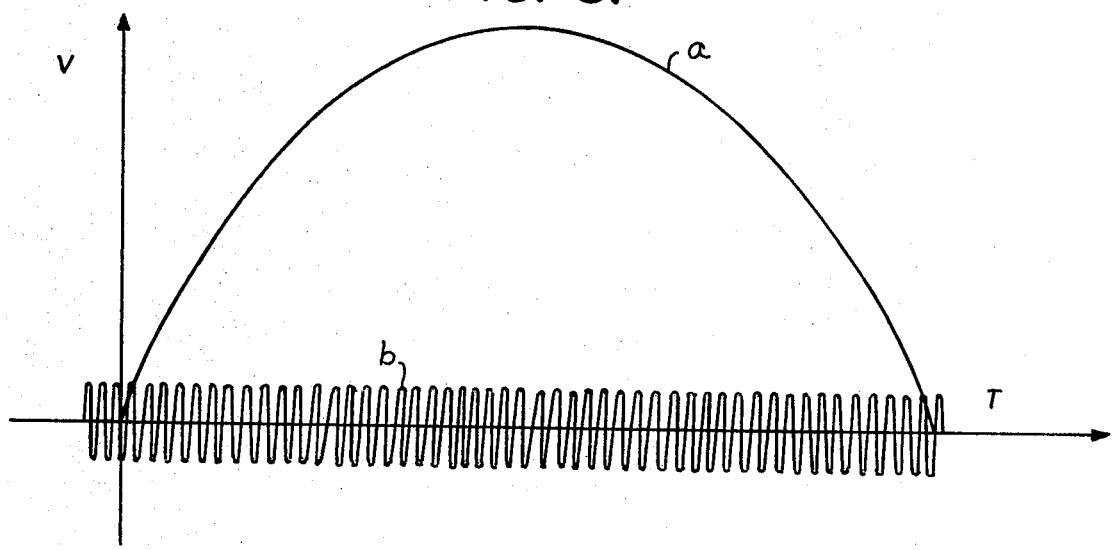
FIG. 3 is a graph illustrating the voltage occurring in the device of the present invention.

The two independent secondary windings 13 and 14, both exactly the same, are, therefore, seats of electromotive force and excite controlled diodes 17 and 18 with a frequency much greater than that of the generator G. In this way it is certain that at the beginning of each of the half-waves to be rectified (curve a of FIG. 3) there is at least an impulse (curve b of FIG. 3) which excites the controlled diode which, becoming conductive, allows the half-wave concerned to pass.

Resistors 15 and 16 serve to produce a heavy load compared to that constituted by the cathode-grid junctions of the controlled diodes, thus making it negligible. This condition is necessary to avoid anomalies in the case of mass production, in consequence of the great dispersion presented by the controlled diodes on this parameter.

The working of the device is as follows: If the battery is charged and, consequently, the voltage is high, greater in any case than the rating of the potentiometer (resistors 1, 2 and 3), a current passes across Zener diode 4 short-circuiting the base of transistor 9 through the saturation of transistor 6. In this case oscillators 7, 8, 9, 10, 11 and 12, do not oscillate and independent secondary windings 13 and 14, not being seats of electromotive force, do not excite controlled diode rectifiers 17 and 18, which, therefore, hinder any passage of current from the generator G to the battery B.

If, however, to the contrary, the voltage of the battery drops, becoming lower than the potentiometer rating, transistor 6 jams and, therefore, the oscillator begins working; controlled diodes 17 and 18 are excited and the generator G charges the battery B. The battery charging apparatus, illustrated as an example in FIG. 1, may also be applied to a three-phase generator G, as shown in the diagram of FIG. 2, with like numerals in both figures indicating like functions. Here controlled diodes 17, 18 and 22, and rectified diodes 23, 24 and 25 are utilized. A third secondary winding 20 and parallel resistor 21 are provided for controlled diode 22.

While we have disclosed several embodiments of the present invention, it is to be understood that these embodiments are given by example only and not in a limiting sense, the scope of the present invention being determined by the objects and the claims.

We claim:

1. An electric generator battery recharging device having an automatic static regulator comprising a permanent magnet rotor means for producing an AC battery charging voltage, an oscillator means, a controlled diode rectifier means connected to said oscillator means and to said rotor means and for becoming conductive and for actuating said rotor means when said oscillator means is operative, said oscillator means operating at a frequency of about 30,000 Hz., said oscillator means including a transformer having at least two independent secondary windings electrically separated from each other, and said controlled diode rectifier means including at least two controlled diode rectifiers each operatively connected to one of said independent secondary windings, respectively, thereby forming at least two independent grid feed circuits.

2. The device, as set forth in claim 1, further comprising a voltage potentiometer means for sensing the voltage on the battery to be charged, a transistor means operatively connected to said oscillator means for stopping said oscillator means when said transistor means is in a predetermined state, and a Zener diode operatively connected between said transistor means and said potentiometer means to cause said transistor means to switch into said predetermined state when the voltage on the battery to be charged exceeds a desired value.

3. The device, as set forth in claim 1, wherein each of said independent secondary windings is directly connected to each of said controlled diode rectifiers, respectively, and a loading resistance connected in parallel across each of said independent secondary windings.

4. The device, as set forth in claim 1, wherein said device including said rotor means being contained in a unitary compact casing with said controlled diodes grounded to said casing.

5. The device, as set forth in claim 1, wherein said oscillator means includes a primary winding and a transistor connected thereto, and an RC network connected to said transistor determining the work frequency of said oscillator means.

6. The device, as set forth in claim 2, wherein said voltage potentiometer means comprises a first and a second resistor connected in parallel and a third resistor connected in series to said first and second resistors, and said Zener diode connected between said third resistor and the parallel connection of said first and second resistors.

References Cited

UNITED STATES PATENTS

| | | | |
|---|---|---|---|
| 3,283,177 | 11/1966 | Cooper | 307—232 |
| 3,300,704 | 1/1967 | McMillen | 320—61 |
| 3,315,141 | 4/1967 | Wright et al. | 320—59 |
| 3,343,059 | 9/1967 | Kirk et al. | 320—39 |
| 3,356,927 | 12/1967 | Barron | 321—18 |
| 3,382,425 | 5/1968 | Legatti | 320—32 |
| 3,409,821 | 11/1968 | Bingley | 323—24 X |
| 3,443,197 | 5/1969 | Raver et al. | 321—18 |

J D MILLER, Primary Examiner

J. M. GUNTHER, Assistant Examiner

U.S. Cl. X.R.

320—39, 59